United States Patent Office 2,761,694
Patented Sept. 4, 1956

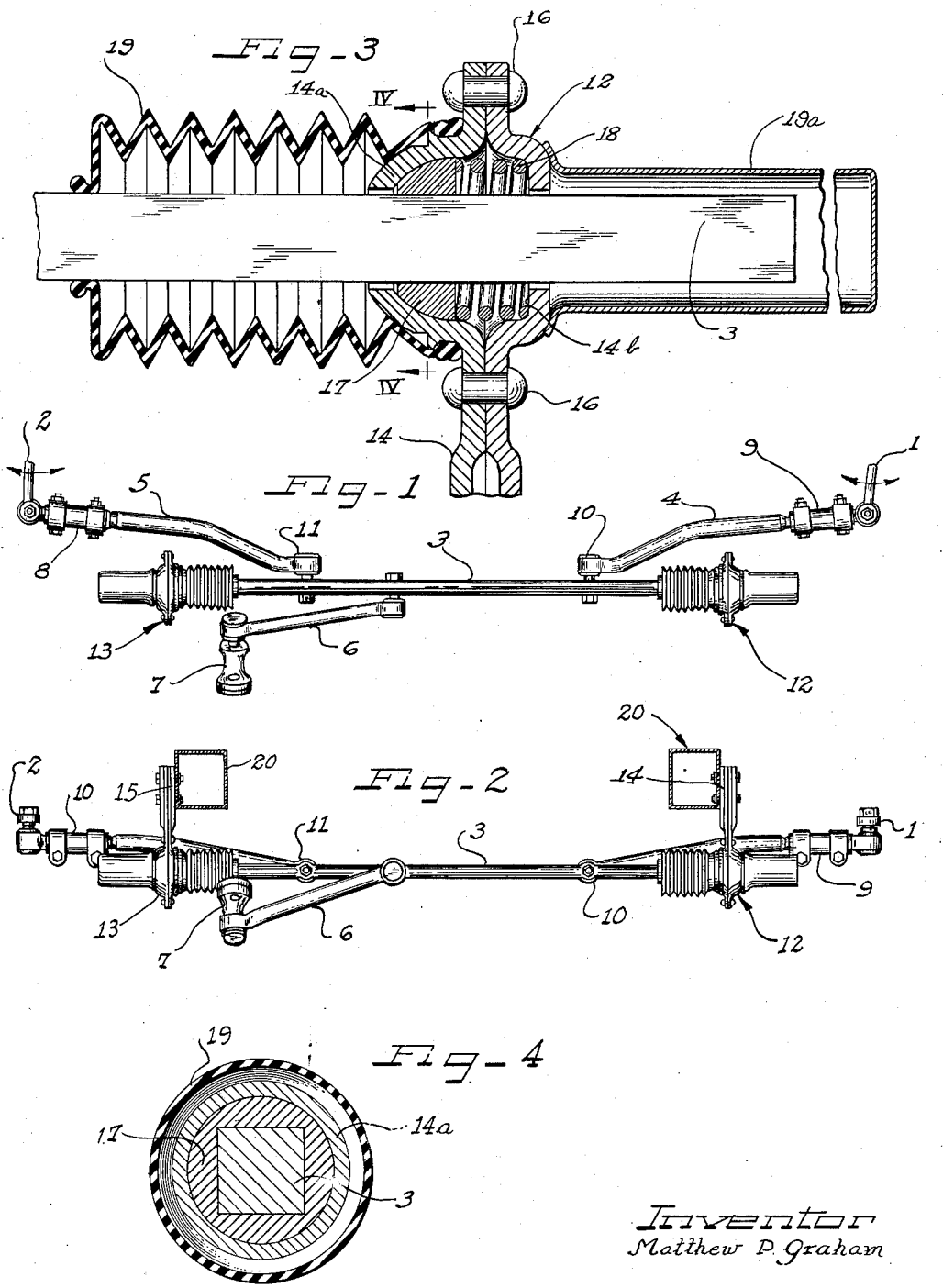

2,761,694

STEERING LINKAGE WITH LONGITUDINALLY RECIPROCATING TIE ROD

Matthew P. Graham, Grosse Pointe, Mich., assignor to Thompson Products, Inc., Cleveland, Ohio, a corporation of Ohio Application July 24, 1952, Serial No. 300,644

3 Claims. (Cl. 280—95)

This invention relates to steering linkages for use with automotive vehicles or other similar vehicles utilizing wheels, a plurality of which are connected for steering purposes.

More particularly this invention contemplates the provision of a steering mechanism in which the transverse rod commonly termed a tie rod, utilized in connecting the two steerable wheels together is arranged to take up a minimum amount of space. In accomplishing this, the present invention contemplates the use of a linkage allowing true reciprocation in the tie rod rather than the compound reciprocation and oscillation movement formerly found in such mechanisms.

The advent of modern automobile design in which the body compartment of the automobile comprises a greater portion of the outside dimensions of the vehicle has required that functioning parts such as the engine and running gear be made increasingly more compact. This is true since although it is desired that the interior of the automobile be made as large as possible for the comfort of passengers, it has been considered undesirable to increase the overall dimensions of the automobile, thereby making it more difficult to park, increasing its weight, and making it generally more difficult to handle. Among other things this trend in larger bodies has moved the engine of the automobile further and further forward with relation to the front wheels of the automobile. This relocation of the engine has occasioned a great difficulty in the designing of the steering linkage since the oil sumps generally considered necessary with modern day engines tend to interfere with the transverse steering linkage members.

Under the present design of steering linkage, a transverse tie rod is generally utilized, which rod is attached to pivoting links termed idling links or pitman arms depending on whether or not the link under discussion is actuating the transverse rod or is merely supporting it for movement at the other end. This arrangement has dictated that the transverse rod not only operates in reciprocation but also follows a path dictated by the arc of oscillation of the connecting points to the oscillating idler and pitman arms. This oscillating component causes the transverse bar to move transversely of its own axis, or in the longitudinal axis of the automobile. Such a movement transversely of the axis of the rod has required that a space be provided through which the rod may pass, with the area of the space being substantially greater than the diameter of the transverse rod in order to allow freedom of movement from one extreme turned position of the wheels to the other. While this difficulty was of no great significance in the early development of automobiles, the above noted trend which requires compactness has made the present linkage undesirable.

The construction disclosed in the instant application has eliminated completely any fore and aft movement of the transverse link in the steering system and it is, therefore, now possible to provide a passageway through or around the oil sump of the automobile engine which is only slightly greater than the actual physical diameter of the transverse link.

By means of the construction of the present invention, the transverse link is further positively maintained in position by aligned bearings rigidly secured to the frame of the automobile so that all vibration and looseness are eliminated from the transverse link, thereby reducing rattling to an absolute minimum.

It is, therefore, an object of the present invention to provide a novel steering mechanism in which the horizontal connecting link or tie rod is allowed to move in reciprocation only.

A further object of the present invention is the provision of a steering linkage which requires the minimum amount of room and which yet maintains proper steering alignment.

Still a further object of the invention is the provision of a steering linkage having a tie rod which moves in a straight line path only and which, therefore, requires an absolute minimum of space.

A further feature of the present invention is the provision of a tie rod for automobile steering linkages which is resiliently supported for reciprocation and in which rotational movement of the tie rod is resiliently restricted.

Still another feature of the present invention is the provision of a steering tie rod link that is directly supported by the frame of the vehicle.

Yet another feature of the instant invention is the provision of an intermediate link between the tie rod and the steering arms of the wheels whereby the path of the tie rod is not affected by the arcuate movement of the steering arms.

Other and further features, objects and advantages of this invention will be apparent to one skilled in the art from the following detailed description of the annexed sheet of drawings which illustrates a preferred embodiment of the invention.

On the drawings:

Figure 1 is a plan view of the steering linkage constructed according to my invention;

Figure 2 is a side elevation of the steering linkage disclosed in Figure 1;

Figure 3 is an enlarged view partially in cross-section showing the construction of the novel guide bearing utilized in the steering linkage herein disclosed; and Figure 4 is a cross-sectional view of the guide bearing with the reciprocating tie rod therein, taken along the lines IV—IV of Figure 3.

As shown on the drawings:

As shown in Figure 1, steering arms 1 and 2 are connected to a reciprocating rod, generally termed a center rod, cross-link or tie rod 3, by means of side links or tie rods 4 and 5. While the wheels are not shown in the figure, it will be apparent to those skilled in the art that the steering arms 1 and 2 are arranged to pivot in an arcuate path as indicated by the arrows, which pivotal movement operates to pivot the wheel spindles, thereby turning the vehicle.

The reciprocating tie rod 3 is pivotally connected to a drag link 6 which is in turn pivotally connected to the pitman arm 7 which is in turn affixed to the oscillating shaft output of the standard steering gear box, not shown.

A provision is made for the adjustment of the toe-in of the wheels in the adjusting clamps 8 and 9 which allow shortening or lengthening of the effective links of the side links 4 and 5. The clamps 8 and 9 are of a standard variety now in common usage for this purpose and are not shown in detail. It should be noted, of course, that the clamps 8 and 9 can be replaced if desired by an adjusting sleeve placed in the tie rod link 3 between the pivotal connections 10 and 11 leading to the side links 4 and 5, respectively. The illustrated adjustment is preferred, however, since, as explained before, it is desired that the rod 3 take-up an absolute minimum of space and it is, therefore, undesirable that accessories, such as clamps, be carried thereby.

The tie rod link 3 is supported for reciprocation by the bearing guides generally indicated at 12 and 13 which are rigidly attached by welding, bolting or some other equivalent means to the longitudinal side frame member 20 of the vehicle. As may be seen from Figure 2, the guides 12 and 13 are suspended to the frame 20 by means of vertical hangers 14 and 15 which may be of any suitable length, depending on the design of the frame, to position the rod 3 in its optimum position. The detailed constructions of the guide bearings 12 and 13 are symmetrically identical and a description of the construction of the guide bearing 12 is, therefore, sufficient.

As shown in Figure 3, the guide bearing 12 is supported in the hanger 14 which comprises a pair of sheet metal stampings riveted or otherwise affixed to each other by fasteners 16. A hemispherical pocket is formed at 14a and a hemispherical bearing ring 17 is positioned therein in close conformity therewith. The hemispherical bearing ring 17 is resiliently maintained against the hemispherical surface of the pocket 14a by means of a spring 18 which is seated in the cavity 14b.

As may be seen from Figure 4, the tie rod 3 is polygonal in cross-section and mates with a corresponding polygonal aperture in the hemispherical bearing ring 17 so that rotational movement between the tie rod 3 and the bearing 17 is prevented. Due to the biasing of the bearing member 17 against the recess 14a by the spring 18, the bearing 17 is resiliently held against turning movement about its own axis. This resistance to turning is extremely desirable in front wheel suspension systems since it reduces the tendency of the tie rod to rotate about its own axis causing wear in the joints between the tie rod and the links 4, 5 and 6.

This resilient biasing also prevents the tie rod 3 from any tendency to vibrate or move transverse of its own longitudinal axis or from rotation about its own longitudinal axis which prevents any rattling from taking place. It should also be noted that steering linkages in modern high speed vehicles are rather precise in their measurements and it is, therefore, necessary that the longitudinal axis of the tie rod 3 remain in substantially the same position after adjustment. The hemispherical bearing 17 with its biasing spring 18 inherently acts to maintain the tie rod 3 in original adjusted position even after some wear has taken place.

The use of a hemispherical bearing also allows some misalignment in the initial installation of the parts, a condition common in mass-produced vehicles. The use of the bearings shown herein permits these manufacturing variances without significant modification of the steering linkage.

In order to prevent road dirt and other foreign matter from penetrating the bearing housing 14 and causing improper bearing action between the bearing 17 and the cup 14a, I have provided sealing members 19 and 19a. The member 19a is preferably an extruded or deep drawn sheet metal housing which is affixed permanently to the housing 14 by means of welding, brazing or other similar fastening technique. The sealing member 19, however, is preferably constructed of a resilient material, such as rubber or plastic, and is constructed in the form of a bellows or other collapsible tube which allows it to maintain a sealing grip with the tie rod 3 during movement of the latter along its longitudinal axis.

In operation, the driver of the vehicle operates the conventional steering wheel, not shown, which in turn oscillates the pitman arm 7. Oscillation of the pitman arm 7 imparts a combined reciprocal and lateral movement to the drag link 6. Since the tie rod 3 is prevented from any movement except reciprocation, the drag link will occupy positions of varying angularity with respect to the tie rod 3. Since the side links 4 and 5 are also pivotally connected to both the tie rod and the steering arm, these arms will change their angularity with respect to the tie rod 3 during reciprocation of the latter. It is apparent that through the use of pivotal connections at both ends of the links 4, 5 and 6, the tie rod 3 is permitted to travel in a true straight line path without causing any binding action between the pitman arm 7 and the steering arms 1 and 2. Any canting or binding action which is set up by the pivoting of the various joints about oblique axes will be eliminated by the guide bearing arrangements 12 and 13 which permit rotation of the tie rod 3 against the frictional force applied by the spring 18 of the bearing 17.

While the connection between the drag links 6 and the tie rod 3 has been shown to be located between the joints 10 and 11, it is, of course, noted that since the tie rod 3 is limited to reciprocable movement, the joint between these members could be placed at any point along the length of the tie rod 3 without altering the steering linkage. This feature is particularly significant in situations where a connection of the member 6 with the tie rod 3 at a point between the joints 10 and 11 would interfere with engine or frame parts.

It is apparent from the above disclosure that I have provided a novel steering linkage in which the necessary transverse tie rod link is reciprocably mounted to thereby occupy a minimum of space and in which vibrations and misalignment of the tie rod are effectively reduced by means of novel guide bearings fixedly secured to the vehicle frame.

It will be understood that modifications and variations may be effected without departing from the scope of the novel concepts of the present invention.

I claim as my invention:

1. A tie rod for use in steering linkages of vehicles having steerable wheels, comprising a rod having a polygonal cross-section, a pair of bearing means located intermediate the ends thereof, each of said bearing means comprising a fixed housing for attachment to the vehicle frame, said housing having a hemispherical cupped bearing surface, a hemispherical bearing within said housing in cooperation with said hemispherical bearing surface of said housing, said hemispherical bearing and cupped bearing surface having polygonal apertures therethrough for the passage of said polygonal tie rod, spring means for biasing said hemispherical bearing against the hemispherical surface of said housing whereby rotation of said tie rod about its longitudinal axis is resiliently restrained and whereby rattles due to vibration of said tie rod are prevented, a pair of pivotal connections carried by said tie rod for connection with means associated with said steerable wheels for transmitting motion of said tie rod to the steerable wheels, and a pivotal connection on said tie rod for connection with mechanism for reciprocating said tie rod.

2. A steering linkage for use in vehicles utilizing a pair of steerable wheels, said linkage comprising a reciprocating tie rod, bearing means resiliently maintaining said tie rod against rotation about its longitudinal axis and for permitting free movement of said tie rod along its longitudinal axis only said bearing means including a member secured against rotation relative to said tie rod and in rotary bearing contact with a fixed part of said vehicle, and resilient means urging said member into resilient frictional engagement with said fixed part, a pair of side links, one end of each of said links being pivotally connected to said tie rod, the other end of each of said links being pivotally connected to a steering arm for the steering movement of the steerable wheels, and link means for causing reciprocation of said tie rod along its longitudinal axis.

3. In a front wheel suspension linkage for use with vehicles having steerable front wheels, a reciprocating tie rod, means connecting said tie rod to said steerable wheels for causing steering movement thereof in response to movement of said tie rod, bearing means for said reciprocating tie rod, said bearing means comprising a housing fixedly carried by said vehicle, hemispherical recessed bearing means in said housing, a hemispherical bearing ring in said recess and cooperating therewith, biasing means for maintaining said bearing ring against said recess, said bearing ring and said recess having apertures therethrough for the passage of said reciprocating tie rod, and seal means between said housing and said tie rod for the prevention of ingress of foreign material into said bearing.

References Cited in the file of this patent

UNITED STATES PATENTS

| | | |
|---|---|---|
| 2,075,085 | Paton | Mar. 30, 1937 |
| 2,464,982 | Leighton | Mar. 22, 1949 |

FOREIGN PATENTS

| | | |
|---|---|---|
| 629,803 | France | Nov. 17, 1927 |
| 685,921 | France | July 18, 1930 |
| 754,454 | France | Nov. 8, 1933 |
| 631,105 | Great Britain | Oct. 27, 1949 |